United States Patent [19]

Mellors

[11] 3,907,597

[45] Sept. 23, 1975

[54] NONAQUEOUS CELL HAVING AN ELECTROLYTE CONTAINING SULFOLANE OR AN ALKYL-SUBSTITUTED DERIVATIVE THEREOF

[75] Inventor: Geoffrey W. Mellors, Strongsville, Ohio

[73] Assignee: Union Carbide Corporation, New York, N.Y.

[22] Filed: Sept. 27, 1974

[21] Appl. No.: 509,820

[52] U.S. Cl............................ 136/100 R; 136/6 LN
[51] Int. Cl.$^2$......................................... H01M 17/00
[58] Field of Search ...... 136/100 R, 6 LN, 154, 155

[56] References Cited
UNITED STATES PATENTS

| | | | |
|---|---|---|---|
| 3,514,337 | 5/1970 | Brauer et al. | 136/100 R |
| 3,542,601 | 11/1970 | Gabano | 136/155 |
| 3,686,038 | 8/1972 | Garth | 136/100 R |
| 3,700,502 | 10/1972 | Watanabe et al. | 136/100 R X |
| 3,796,604 | 3/1974 | Gabano et al. | 136/6 LN |
| 3,796,605 | 3/1974 | Deckenaux et al. | 136/6 LN |

FOREIGN PATENTS OR APPLICATIONS

| | | | |
|---|---|---|---|
| 2,124,388 | 2/1972 | France | 136/155 |

*Primary Examiner*—John H. Mack
*Assistant Examiner*—C. F. LeFevour
*Attorney, Agent, or Firm*—C. F. O'Brien

[57] ABSTRACT

A nonaqueous cell utilizing a highly active metal anode, such as lithium, a solid cathode such as $(CF_x)_n$, copper sulfide or the like, and a liquid organic electrolyte consisting essentially of sulfolane or its liquid alkyl-substituted derivatives in combination with a cosolvent, preferably a low viscosity cosolvent such as dioxolane, and an ionizing solute, such as $LiClO_4$.

11 Claims, No Drawings

NONAQUEOUS CELL HAVING AN ELECTROLYTE CONTAINING SULFOLANE OR AN ALKYL-SUBSTITUTED DERIVATIVE THEREOF

FIELD OF THE INVENTION

This invention relates to a nonaqueous cell utilizing a highly active metal anode, a solid cathode and a liquid organic electrolyte consisting essentially of sulfolane or a liquid alkyl-substituted derivative thereof, in combination with a low viscosity cosolvent and a selected solute.

BACKGROUND OF THE INVENTION

The development of high energy battery systems requires the compatibility of an electrolyte possessing desirable electrochemical properties with highly reactive anode materials, such as lithium, calcium and the like, and the efficient use of high energy density cathode materials, such as fluorinated carbon, copper sulfide and the like. The use of aqueous electrolytes is precluded in these systems since the anode materials are sufficiently active to react with water chemically. It has therefore been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or complex salt of Group I-A, Group II-A or Group III-A elements of the Periodic Table, dissolved in an appropriate nonaqueous organic solvent. Conventional solvents include propylene carbonate, ethylene carbonate or γ-butyrolactone, or the like. The term "Periodic Table" as used herein refers to the Periodic Table of the Elements as set forth on the inside back cover of the Handbook of Chemistry and Physics, 48th Edition, The Chemical Rubber Co., Cleveland, Ohio, 1967–1968.

A multitude of solutes is known and recommended for use but the selection of a suitable solvent has been particularly troublesome since many of the solvents which can be used to prepare electrolytes sufficiently conductive to permit effective ion migration through the solution, are reactive with the highly reactive anodes described above. Consequently many investigators in search of suitable solvents have concentrated on aliphatic and aromatic nitrogen- and oxygen-containing compounds with some attention given to organic sulfur-, phosphorus- and arsenic-containing compounds. The results of this search have not been entirely satisfactory since many of the solvents investigated still could not be used effectively with extremely high energy density cathode materials, such as fluorinated carbon, and were sufficiently corrosive to lithium anodes to prevent efficient performance over any length of time.

U.S. Pat. No. 3,547,703 to Blomgren et al discloses the use of a nonaqueous battery electrolyte employing a solute dissolved in ethylene glycol sulfite. U.S. Pat. Nos. 3,536,532 and 3,700,502 disclose nonaqueous cells employing solid fluorinated carbon $[(CF_x)_n]$ as the active cathode material in conjunction with a light metal anode and a conventional nonaqueous electrolyte.

French Pat. No. 2,124,388 discloses an nonaqueous electrolyte using dioxolane as the solvent.

An article, appearing in J. Electrochemical Society — Vol. 118 — March 1971, pp. 461-2, by Abner Brenner discloses the results of some experiments directed toward the electrodeposition of lithium using an electrolyte consisting of 10% solution of lithium fluoborate in a solvent of sulfolane or 3-methyl sulfolane. Although a high back EMF was observed for the cells described in the article, the author concludes that he is not suggesting that the cells have any utility as a high energy density battery in the form disclosed in the article.

Another article which appeared in the Journal of Physical Chemistry — Vol. 77, pp. 718-721 — 1973 and authored by Arden P. Zipp discloses the results of conductance measurements for sulfolane and 3-methyl sulfolane solutions containing several alkali metal and tetraalkylammonium picrates. The conclusion reached by the author is that electrolytes in 3-methyl sulfolane exhibit greater association and lower mobilities than in sulfolane itself, presumably due to the lower dielectric constant and the larger molecular volume produced by replacing a hydrogen atom with a methyl group.

U.S. Pat. No. 3,542,601 discloses a nonaqueous electrolyte for electromechanical cells wherein the solvent of the electrolyte is a heterocyclic compound having a saturated ring containing at least one hetero-atom selected from S and O and further characterized that there must be at least one free electron pair on the S or O atom in the ring. Thus the teaching of this patent is restricted to a limited class of solvents.

In a National Aeronautics and Space Administration publication (NASA TM X-1283, August 1966) by Richard E. Johnson, it is disclosed that sulfolane was one of several organic sulfur compounds investigated in a study of electrolytic solvent properties. Sulfones (including sulfolane) were indicated as showing some promise, but their high melting points made them less desirable. In addition, the conductivity data obtained for sulfolane saturated with $KClO_4$ showed it to be below the minimum value of at least $10^{-3}$ ohm$^{-1}$ cm$^{-1}$ which was set as one of the requirements for qualifying as a good solvent for use in electrolytes.

In an Interim Report No. 2 dated September, 1967 on "Non-aqueous Electrolyte Systems" by Douglas N. Bennion, for the Department of the Army under AMERDC Contract DA-44-009-AMC-1661(T), it is disclosed that although sulfolane (tetramethylene sulfone) was observed to be a good electrolyte solvent, it was very viscous and no conclusions could be given as to how it would perform in a battery. The Final Report under this contract was issued on February, 1971 and reported only the main solvents of interest which were dimethyl sulfoxide, tetramethylene sulfoxide and dimethyl sulfite. The omission of sulfolane in the Final Report was probably due to its elimination from further study because of its high viscosity and melting point.

While the theoretical energy, i.e., the electrical energy potentially available from a selected anode-cathode couple, is relatively easy to calculate, there is need to choose a nonaqueous electrolyte for such couple that permits the actual energy produced by an assembled battery to approach the theoretical energy. The problem usually encountered is that it is practically impossible to predict in advance how well, if at all, a nonaqueous electrolyte will function with a selected couple. Thus a cell must be considered as a unit having three parts, a cathode, an anode and an electrolyte, and it is to be understood that the parts of one cell are not predictably interchangeable with parts of another cell to produce an efficient and workable cell.

It is an object of the present invention to provide a nonaqueous cell employing among other components a liquid organic electrolyte based on sulfolane or a liquid alkyl-substituted derivative thereof in combination with a low viscosity cosolvent and a solute.

It is a further object of the present invention to provide a nonaqueous cell which utilizes a highly active metal anode, such as lithium, a solid cathode such as $(CF_x)_n$ or copper sulfide and a liquid organic electrolyte based on sulfolane or its liquid alkyl-substituted derivatives in combination with a low viscosity cosolvent and a solute.

It is a further object of the invention to provide an electrolyte solvent system for nonaqueous solid cathode cells which comprises 3-methyl sulfolane in combination with a low viscosity cosolvent and a solute.

It is a further object of this invention to provide a nonaqueous cell which utilizes a lithium anode, a solid $(CF_x)_n$ cathode and a liquid organic electrolyte based on sulfolane or 3-methyl sulfolane in combination with a low viscosity cosolvent such as dioxolane and a solute such as $LiClO_4$.

SUMMARY OF THE INVENTION

The invention provides a novel high energy density nonaqueous cell comprising a highly active metal anode, a solid cathode and a liquid organic electrolyte consisting essentially of a solvent selected from the group consisting of sulfolane, a liquid alkyl-substituted derivative thereof, and mixtures thereof, at least one low viscosity co-solvent and an ionizable solute.

Highly active metal anodes suitable for this invention include lithium (Li), potassium (K), calcium (Ca), magnesium (Mg) and their alloys. Of these active metals, lithium would be preferred because in addition to being a ductile, soft metal that can easily be assembled in a cell, it possesses the highest energy-to-weight ratio of the group of suitable anode metals. Sodium anodes are not desirable because they react with sulfolane.

Cathodes for use in this invention are the solid electrodes which include fluorinated carbon represented by the formula $(CF_x)_n$ wherein $x$ varies between about 0.5 and about 1.2 and wherein $n$ refers to the number of monomer units which can vary widely, copper sulfide (CuS), copper oxide (CuO), manganese dioxide ($MnO_2$), lead dioxide ($PbO_2$), iron sulfide ($FeS_2$), copper chloride ($CuCl_2$), silver chloride (AgCl), and sulfur (S). The $(CF_x)_n$ electrodes are composed of carbon and fluorine, said carbon including graphitic and non-graphitic forms of carbon, such as coke, charcoal or active carbon. As disclosed in U.S. Pat. Nos. 3,536,532 and 3,700,502, solid fluorinated carbon electrodes are extremely stable and resistive to chemicals over the range of values of $x$ from 0 to about 1. Preferably, $(CF_x)_n$ cathodes wherein $x$ varies between about 0.8 and about 1.1 would be admirably suited for use with the specific electrolyte of the invention because this range represents the best combination of available energy density and conductivity of the cathode materials.

Sulfolane and its liquid alkyl-substituted derivatives are ideally suited for use with highly active metal anodes because they effectively passivate the highly active anodes to prolong the shelf life of the cell while not passivating the anodes to such an extent that the cell becomes effectively inoperable. Although not wanting to be bound by theory, it is believed that sulfolane or its liquid alkyl-substituted derivatives form a passivating type of film on the surface of the active anode which effectively prevents or minimizes wasteful corrosion during cell storage.

The preferred solvents for use in this invention are sulfolane and 3-methyl sulfolane. Sulfolane, which is a 1,1-dioxotetrahydrothiophene and is sometimes called tetramethylene sulfone, is a saturated heterocyclic compound of the structure:

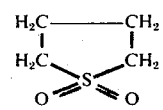

Some of the physical properties of sulfolane are shown in Table 1:

TABLE 1

| | |
|---|---|
| Melting Point (°C.) | 28 |
| Boiling Point (°C.) | 283 |
| Sp. Cond., 25°C. (ohm$^{-1}$ cm$^{-1}$) | $2 \times 10^{-8}$ |
| Dielectric Constant, 25°C. | 44 |
| Density, 30°C. (g/cm$^3$) | 1.2615 |
| Viscosity, 30°C. (centipoise) | 9.87 |
| Freezing Point Depression Constant | 66.2 |

The 3-methyl sulfolane, which is a liquid alkyl-substituted derivative of the above structure, has the following structure:

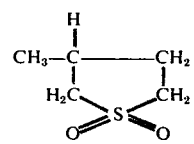

Sulfolane and its liquid alkyl-substituted derivatives, such as 3-methyl sulfolane, are good nonaqueous solvents but have the disadvantage in that they have a relatively high viscosity. Thus when metal salts are dissolved in these solvents for the purpose of improving the conductivity of the solvents, the viscosity of the solution becomes too high for its efficient use as an electrolyte for nonaqueous cell applications. Thus, in accordance with this invention, the addition of a low viscosity cosolvent is necessary if sulfolane and its liquid alkyl-substituted derivatives are to be used as an electrolyte for nonaqueous cells which can operate or perform at a high energy density level. Thus the invention is directed to a novel high energy density cell having a highly active metal anode, such as lithium, a solid cathode, such as $(CF_x)_n$ and a nonaqueous electrolyte comprising sulfolane and/or its liquid alkyl-substituted derivatives in combination with a low viscosity cosolvent and an ionizable solute.

The sulfolane and/or its liquid alkyl-substituted derivatives should comprise no more than 80% by volume based on the volume of the solvent and cosolvent components of the electrolyte since to have more than this, the electrolyte would be too viscous for efficient high energy density cell applications. An amount less than about 20% by volume would also be unsatisfactory because there would not be sufficient sulfolane to impart the desired degree of passivity to the highly reactive anode material, since without said passivity the shelf life of the cell would be seriously impaired. The preferred amount of the sulfolane and/or its liquid alkyl-substituted derivatives in the electrolyte is between about 65% and about 45% by volume.

It is necessary that the sulfolane or its liquid alkyl-substituted derivatives be essentially free of water. Consequently, since the commercially available solvent materials of this invention usually contain excessive water for their efficient use in nonaqueous cells, the solvent materials usually have to be processed to remove the water contents to an acceptable level of about 200 ppm or lower, preferably about 50 ppm or lower. However, it will be appreciated that due to the passivating effect achieved by the use of the solvents of this invention, minor amounts of water in the above ranges can be tolerated in contrast to the generally necessary and accepted levels in conventional electrolytes for nonaqueous cell systems. In addition, if sulfolane is manufactured from $SO_2$ + butadiene, followed by hydrogenation of the dihydro compound, then there exists the probability that both $SO_2$ + butadiene remain as residuals. By heating with NaOH under argon (preferably with stirring by an argon bubbler) at 140°C.–150°C., both $SO_2$ and butadiene can be removed. Subsequently, distillation under reduced pressure produces a clear liquid that freezes to a colorless solid at about 28°C. The material has a sweet smell after treatment as opposed to the pungent odors as received and the latter is quite uncharacteristic of sulfolane.

In addition to the above, it is necessary to substantially remove excessive amounts of water greater than 200 ppm from the solvent material and this can be accomplished, for example, by treatment with suitable commercially available molecular sieves. Other techniques for removing excessive water from liquid material are well known in the art and need not be further described here.

The low viscosity cosolvents for use in this invention include tetrahydrofuran (THF), dioxolane, dimethoxyethane (DME), dimethyl isoxazole (DMI), diethyl carbonate (DEC), ethylene glycol sulfite (EGS), dioxane, dimethyl sulfite (DMS), γ-butyrolactone (GBL) or the like. Tetrahydrofuran and 1,3-dioxolane are preferred cosolvents because of their compatibility with metal salts dissolved in liquid sulfolane and/or its liquid alkyl-substituted derivatives and their chemical inertness to cell components. Specifically, the total amount of the low viscosity cosolvent(s) added should be between about 20% and about 80% based on total solvent and cosolvent volume, i.e., exclusive of solute, so as to lower the viscosity to a level suitable for use in a cell, said level being generally less than about 5 centipoise at 30°C., preferably less than about 3.

The ionizing solute for use in this invention may be a simple ($LiClO_4$) or double salt or mixtures thereof, which will produce an ionically conductive solution when dissolved in one or more solvents. Preferred solutes are complexes of inorganic or organic Lewis acids and inorganic ionizable salts. One of the requirements for utility is that the salts, whether simple or complex, be compatible with the solvent and cosolvent(s) being employed and that they yield a solution which is sufficiently ionically conductive, e.g., at least about $10^{-4}$ $ohm^{-1}$ $cm^{-1}$. Generally, an amount of at least about 0.5M (moles/liter) would be sufficient for most cell applications.

According to the Lewis or electronic concept of acids and bases, many substances which contain no active hydrogen can act as acids or acceptors of electron doublets. The basic concept is set forth in the chemical literature (Journal of the Franklin Institute, Vol. 226 - July/December 1938, pages 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical suitable Lewis acids include aluminum fluoride, aluminum bromide, aluminum chloride, antimony pentachloride, zirconium tetrachloride, phosphorus pentachloride, phosphorus pentafluoride, boron fluoride, boron chloride, boron bromide, and arsenic pentafluoride.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such preferable double salt, for example, is that formed by the combination of aluminum chloride and lithium chloride to yield lithium aluminum tetrachloride. Other preferable double salts would be lithium tetrafluoroborate ($LiBF_4$), lithium hexafluoroarsenate ($LiAsF_6$), lithium hexafluorophosphate ($LiPF_6$) and potassium hexafluoroarsenate ($KAsF_6$).

A main criteria in selecting an ionizable salt is that it be compatible and non-reactive with the solvent, the cosolvent and the electrodes of the cell. Likewise, the nonaqueous electrolyte has to be inert with respect to the highly active anode metal while at the same time the anode should not be so completely passivated that when the cell is placed on discharge, delay in the flow of current would result.

Although it should be understood that not all combinations of solvents, cosolvents and solutes will function as efficient electrolytes in all anode/cathode cell systems, once the anode and cathode components of a nonaqueous cell are selected, it is within the skill of an artisan to select a suitable cosolvent and solute to be used with the solvents of this invention to yield an electrolyte that will function efficiently in the nonaqueous cell system.

Preferable nonaqueous cell systems according to this invention are shown in Table 2:

TABLE 2

| | Nonaqueous Cell Systems | | |
|---|---|---|---|
| Anode | Cathode | Solvent | Solute |
| Li | $(CF_x)_n$ | Sulfolane/Dioxolane | $KAsF_6$ |
| Li | CuS | Sulfolane/Dioxolane | $LiClO_4$ |
| Li | CuS | Sulfolane/ | $LiAlCl_4$ |

TABLE 2-Continued

| | Nonaqueous Cell Systems | | |
|---|---|---|---|
| Anode | Cathode | Solvent | Solute |
| Li | CuO | Dioxolane Sulfolane/ Dioxolane | $LiClO_4$ |

EXAMPLE I

Parallel plate test cells were made in airtight glass containers, the dimensions of which were 3.8 cm diameter and 0.7 cm in height. Electrical leads were passed through epoxy cement seals and connected to the electrodes within the container.

The anode of each cell was a sheet of lithium with 4 cm² surface area; each cathode was of similar apparent area. The cathode contained 80 wt. % active material ($\approx CF_{1.0}$), 10 wt. % carbon black, 10 wt. % hydroxyethylcellulose and a fibrous cellulosic binder or 10 wt. % polytetrafluoroethylene pressed onto an expanded nickel screen. About 30 ml of the selected electrolyte, as indicated in Table 3, was employed in each cell.

The theoretical capacity of $(CF_x)_n$, where x = 1, was calculated to be 0.864 Ah/g as disclosed in U.S. application Ser. No. 462,792. The cells were made with about 0.23 to 0.28 g. of active cathode material.

The cells were tested by being discharged across a resistive load to a selected voltage cutoff. The results of the test are shown in Table 3.

TABLE 3

$Li/(CF_x)_n$ Cells (Electrolyte: 50/50 by Volume Sulfolane-Dioxolane + 1M $LiClO_4$)

| Load (ohms) | Cell Capacity (mAh) | Cutoff Voltage | Eff. of $(CF_x)_n$ (%) | Wt. $(CF_x)_n$ (g) | Wh/g $(CF_x)_n$ | Wh/in³* |
|---|---|---|---|---|---|---|
| 1000 | 252 | 1.9 | 117 | 0.25 | 2.17 | 31.8 |
| 500 | 205 | 1.9 | 103 | 0.23 | 1.83 | 24.7 |
| 250 | 224 | 1.9 | 112 | 0.23 | 1.96 | 26.5 |
| 125 | 157 | 1.75 | 80 | 0.28 | 1.23 | 16.5 |

*Calculated from actual dimensions of cathode.

Cathode efficiencies of over 100% are believed due to the use of the active carbon black material which is a very active carbon and has been observed in previous nonaqueous cell systems to contribute to the capacity of the cell during discharge.

EXAMPLE II

Parallel plate cells of the type described in Example I were made using copper sulfide (CuS) cathodes. Fine mesh copper powder and sulfur in stoichiometric amounts were tumbled overnight to mix thoroughly, pressed onto a nickel screen, and then heat-treated under argon at 100°C. for 16 hours. The electrode surface area used in the cells was 4 cm². The anode and the electrolyte were the same as that of Example 1.

The cells were tested as in Example I and the results obtained are shown in Table 4.

TABLE 4

Li/50:50 Sulfolane-Dioxolane + 1M $LiClO_4$/CuS System

| Load (ohms) | Capacity (mAh) | Cutoff Voltage | Capacity (mAh/g CuS) | Eff. of CuS ($Cu^{2+} \rightarrow Cu^{1+}$) (%) | Wh to 1.9V Cutoff | Wh/g CuS* | Wh/in³** |
|---|---|---|---|---|---|---|---|
| 1000 | 408 | 1.86 | 272 | 97.1 | 0.775 | 0.516 | 19.62 |
| 500 | 303 | 1.74 | 266 | 95.0 | 0.576 | 0.505 | 15.13 |

*Using an average voltage of 1.9V.
**Calculated from actual dimensions of cathode.

It will be noticed that these results refer to the first step of the reduction of copper sulfide, i.e., $Cu^{2+} + 1e^- \rightarrow Cu^{1+}$ in this system; the second step, $Cu^{1+} + 1e^- \rightarrow Cu^0$, is absent. This is a distinct advantage in that substantially all of the cells' output is at the potential of the first step.

EXAMPLE III

Using cells similar to those of Example I and the CuS cathodes of the type described in Example II, 6 cells were constructed using 50/50 (by volume) sulfolane-dimethoxyethane + 1M $LiClO_4$ as the electrolyte. These cells were tested as described above and the average test data are shown in Table 5.

TABLE 5

Li/Sulfolane-DME - 1M $LiClO_4$/CuS System (1000 ohms Load - 0.5 mA/cm²)

| Capacity (mAh) | Capacity (mAh/g CuS) | Cutoff (V) | Cathode Eff. (%) | Wh to 2.0V Cutoff | Wh to 1.62V Cutoff | Wh/g CuS | Wh/in³ CuS*** |
|---|---|---|---|---|---|---|---|
| 280.0 | 255.0 | 1.95 | First Step $Cu^{2+} \rightarrow Cu^{1+}$ 91.1 | 0.500 | — | 0.509* | 14.18 |
| 81.0 | 73.6 | 1.62 | Second Step $Cu^{+1} \rightarrow Cu^0$ 21.8 | — | 0.131 | 0.143** | 4.26 |

*Based on a cutoff voltage of 2.0V.
**Based on a cutoff voltage of 1.62V.
***Calculated from actual dimensions of cathode.

EXAMPLE IV

Several cells of the type disclosed in Example I were produced using several electrolytes and/or different cathodes as shown in Table 6. The cells were discharged across 500 ohms and the resulting data are also shown in Table 6. The copper oxide electrodes were made from Fisher certified materials, and the mix consisted of 25.0 g CuO, 3.5 g of a polytetrafluoroethylene emulsion, 1.0 g carbon black and 0.4 g glass fiber. The cathode current was 1 mA/cm$^2$ unless otherwise stated.

TABLE 6

(Cathode Current Density Run at 1 mA/cm$^2$)

| Electrolyte Solvent | Electrolyte Salt | Cutoff Voltage | Cathode Matl. | Cathode Current Eff. (%) |
|---|---|---|---|---|
| Sulfolane-dioxolane (50/50 % by volume) | LiBF$_4$ (1 M) | 1.5 | $(CF_x)_n$* | 89 |
| 3-Methyl Sulfolane-Dioxolane (50/50 v/o) | LiClO$_4$ (1 M) | 1.5 | $(CF_x)_n$ | 94 |
| Sulfolane-Dioxolane (50/50 v/o) | LiAlCl$_4$ (1 M) | 1.5 | $(CF_x)_n$ | 96 87** |
| Sulfolane-Dioxolane (50/50 v/o) | LiClO$_4$ (1.M) | 1.0 | CuO | 98 |
| Sulfolane-Dioxolane (50/50 v/o) | KAsF$_6$ (0.44 M) | 1.5 | $(CF_x)_n$ | 102 |
| Sulfolane-Dioxolane (50/50 v/o) | KAsF$_6$ (1.02 M) | 1.5 | $(CF_x)_n$ | 98 |
| Sulfolane-Dioxolane (50/50 v/o) | LiAsF$_6$ (0.51 M) | 1.5 | $(CF_x)_n$ | 102 |
| Sulfolane-Dioxolane (50/50 v/o) | LiAsF$_6$ (1.30 M) | 1.5 | $(CF_x)_n$ | 70 |
| Sulfolane-Dioxolane (50/50 v/o) | LiClO$_4$ (1 M) | 1.5 | $(CF_x)_n$ | 102 |
| Sulfolane-Dioxolane (50/50 v/o) | LiBF$_4$ (1 M) | 1.5 | $(CF_x)_n$ | 88 |
| Sulfolane-Dioxolane (50/50 v/o) | KPF$_6$ (0.55 M) | 1.5 | $(CF_x)_n$ | 113 |
| Sulfolane-Dioxolane (60/40 v/o) | LiClO$_4$ (1 M) | 1.5 | $(CF_x)_n$ | 98 |
| Sulfolane-Dioxolane (60/40 v/o) | LiClO$_4$ (1 M) | 1.6 | CuS | 94 |
| Sulfolane-Dioxolane (60/40 v/o) | LiClO$_4$ (1 M) | 1.0 | CuO | 103 |
| Sulfolane-γ-Butyrolactone (50/50 v/o) | LiClO$_4$ (1 M) | 1.5 | $(CF_x)_n$ | 90 |
| Sulfolane-γ-Butyrolactone (50/50 v/o) | LiBF$_4$ (1 M) | 1.5 | $(CF_x)_n$ | 85 |

*x = 0.85 − 1.0 for all $(CF_x)_n$ cathodes.
**based on 2 mA/cm$^2$ current density.

EXAMPLE V

Four sealed jelly roll cells were constructed using steel cans. Lithium sheet anodes measuring 0.020 inch (.05 cm) in thickness (1.9 cm width × 20.5 cm length), $(CF_{0.85-1.0})_n$ sheet cathodes of the same dimensions, and polypropylene separators were employed with a 50/50 % by volume sulfolane-dioxolane solvent containing 1.0 M lithium perchlorate. Table 7 shows the data obtained from these cells on 10-ohm and 44-ohm continuous drains.

TABLE 7

Jelly Roll Cells

| Load (ohms) | Avg. Discharge Voltage (V) | Current Density mA/cm$^2$ | Ah to 1.5 V | Wh/in$^3$* | Cathode Eff. (%) |
|---|---|---|---|---|---|
| 10 | 2.10 | 2.10 | 2.7 | 6.4 | 93 |
| 10 | 2.04 | 2.04 | 2.3 | 5.3 | 79 |
| 44 | 2.16 | 0.49 | 2.5 | 6.1 | 86 |
| 44 | 2.11 | 0.48 | 2.8 | 6.6 | 96 |

EXAMPLE VI

Five sealed jelly roll cells were constructed using various electrolytes. The jelly roll cells were similar to the type of Example V except that the length of the strips was now 18.0 cm. These cells were discharged across a 50-ohm resistive load, giving a current density of 0.65 mA/cm$^2$, to a cutoff voltage of 1.5 V. The result of this test is set out in Table 8.

TABLE 8

| Electrolyte Solvent | Electrolyte Salt | Cathode Current Efficiency (%)* |
|---|---|---|
| Sulfolane-Dioxolane (50/50 % by vol.) | KAsF$_6$ (1.0 M) | 82 |
| Sulfolane-Dioxolane (50/50 % by vol.) | LiAsF$_6$ (1.30 M) | 98 |
| Sulfolane-γ-Butyrolactone-Dioxolane (45/45/10 % by vol.) | LiAsF$_6$ (0.51 M) | 70 |
| Sulfolane-Dioxolane (50/50 % by vol.) | KPF$_6$ (0.55 M) | 60 |
| Sulfolane-Dioxolane (50/50 % by vol.) | LiBF$_4$ (1.0 M) | 90 |

*These were all $(CF_x)_n$ where x = 0.85 to 1.0.

EXAMPLE VII

Seven parallel plate cells made identical to those disclosed in Example I were tested across a 500-ohm load (current density = 1 mA/cm$^2$) to a cutoff voltage of 1.5 V after having been stored at 71°C. for 9 days. Seven identical cells were tested fresh at 25°C. in the same manner. The results of these tests are shown in Table 9.

TABLE 9

| Electrolyte Solvent | Electrolyte Salt | % Eff. of CF$_x$ Cathodes Fresh | Stored |
|---|---|---|---|
| Sulfolane-Dioxolane (50/50 % by vol.) | LiClO$_4$ (1.0 M) | 110 | 78 |
| Sulfolane-γ-Butyrolactone (50/50 % by vol.) | LiClO$_4$ (1.0 M) | 102 | 69 |
| Sulfolane-Dioxolane (50/50 % by vol.) | KPF$_6$ (0.55 M) | 113 | 25 |
| Sulfolane-Dioxolane (50/50 % by vol.) | KAsF$_6$ (0.44 M) | 102 | 98 |
| Sulfolane-Dioxolane (50/50 % by vol.) | KAsF$_6$ (1.02 M) | 97 | 100 |
| Sulfolane-Dioxolane (50/50 % by vol.) | LiAsF$_6$ (0.51 M) | 102 | 91 |
| Sulfolane-Dioxolane (50/50 % by vol.) | LiAsF$_6$ (1.3 M) | 70 | 95 |

Since it is generally accepted that 1 week storage at 71°C. is approximately equal to one year's storage at 2-5°C., the data above clearly demonstrate that the cells made in accordance with this invention can be characterized as having long shelf life without deterioration of their power output.

EXAMPLE VIII

Five jelly roll cells made identical to those of Example V using a $(CF_x)_n$ cathode, after being stored for 11 days at 71°C., were tested across a 50-ohm resistive load (0.65 mA/cm$^2$) to a cutoff voltage of 1.5 V. The results of these tests are shown in Table 10. Again, the data demonstrated that the cells of this invention can be characterized as having long shelf life.

TABLE 10

| Electrolyte Solvent | Electrolyte Salt | % Eff. of CF$_x$ after Storage at 71°C. |
|---|---|---|
| Sulfolane-Dioxolane | LiAsF$_6$ | 94 |

TABLE 10-Continued

| Electrolyte Solvent | Electrolyte Salt | % Eff. of $CF_x$ after Storage at 71°C. |
|---|---|---|
| (50/50 % by vol.) Sulfolane-Dioxolane | (1.3 M) LiAsF$_6$ | 91 |
| (50/50 % by vol.) Sulfolane-Dioxolane | (1.0 M) KAsF$_6$ | 100 |
| (50/50 % by vol.) Sulfolane-Dioxolane | (1.02 M) KAsF$_6$ | 90 |
| (50/50 % by vol.) Sulfolane-Dioxolane | (0.44 M) LiClO$_4$ | 83 |
| (60/40 % by vol.) | (1.0 M) | |

While the present invention has been described with reference to many particular details thereof, it is not intended that these details shall be construed as limiting the scope of this invention.

What is claimed is:

1. A nonaqueous cell comprising a highly active metal anode selected from the group consisting of lithium, potassium, calcium, magnesium, and their alloys, a solid cathode, and a nonaqueous electrolyte consisting essentially of at least one solvent selected from the group consisting of sulfolane and its liquid alkyl-substituted derivatives thereof essentially free of water, at least one low viscosity organic cosolvent and an ionizable solute.

2. The nonaqueous cell of claim 1 wherein said at least one solvent is selected from the group consisting of sulfolane and 3-methyl sulfolane.

3. The nonaqueous cell of claim 2 wherein said at least one low viscosity cosolvent is selected from the group consisting of tetrahydrofuran, dioxolane, dimethoxyethane, dimethyl isoxazole, diethyl carbonate, ethylene glycol sulfite, dioxane, dimethyl sulfite and γ-butyrolactone.

4. The nonaqueous cell of claim 2 wherein the solute is selected from the group consisting of lithium aluminum tetrachloride, lithium tetrafluoroborate, lithium hexafluoroarsenate, lithium hexafluorophosphate, potassium hexafluoroarsenate, potassium hexafluorophosphate and lithium perchlorate.

5. The nonaqueous cell of claim 2 wherein the cathode is selected from the group consisting of $(CF_x)_n$, copper sulfide, copper oxide, manganese dioxide, lead dioxide, iron sulfide, copper chloride, silver chloride and sulfur.

6. The nonaqueous cell of claim 2 wherein said anode is lithium, said cathode is $(CF_x)_n$, said solvent is sulfolane, said cosolvent is dioxolane and said solute is lithium perchlorate.

7. The nonaqueous cell of claim 2 wherein said anode is lithium, said cathode is $(CF_x)_n$, said solvent is 3-methyl sulfolane, said cosolvent is dioxolane and said solute is lithium perchlorate.

8. The nonaqueous cell of claim 2 wherein said anode is lithium, said cathode is $(CF_x)_n$, said solvent is sulfolane, said cosolvent is dioxolane and said solute is potassium hexafluoroarsenate.

9. The nonaqueous cell of claim 2 wherein said anode is lithium, said cathode is copper sulfide, said solvent is sulfolane, said cosolvent is dioxolane and said solute is lithium perchlorate.

10. The nonaqueous cell of claim 2 wherein said anode is lithium, said cathode is copper sulfide, said solvent is sulfolane, said cosolvent is dioxolane and said solute is lithium aluminum tetrachloride.

11. The nonaqueous cell of claim 2 wherein said anode is lithium, said cathode is copper oxide, said solvent is sulfolane, said cosolvent is dioxolane and said solute is lithium perchlorate.

* * * * *

UNITED STATES PATENT OFFICE
CERTIFICATE OF CORRECTION

Patent No. 3,907,597  Dated September 23, 1975

Inventor(s) G. W. Mellors

It is certified that error appears in the above-identified patent and that said Letters Patent are hereby corrected as shown below:

Column 2, line 26, "electromechanical" should read
-- electrochemical --.

Column 10, lines 48-49, "2-5°C." should read -- 25°C. --.

Signed and Sealed this seventeenth Day of February 1976

[SEAL]

Attest:

RUTH C. MASON
Attesting Officer

C. MARSHALL DANN
Commissioner of Patents and Trademarks